March 31, 1970 W. J. BERRY 3,503,877
DIALYZER AGITATOR

Filed April 9, 1965 2 Sheets-Sheet 1

INVENTOR.
WILLIAM J. BERRY
BY
David Raber

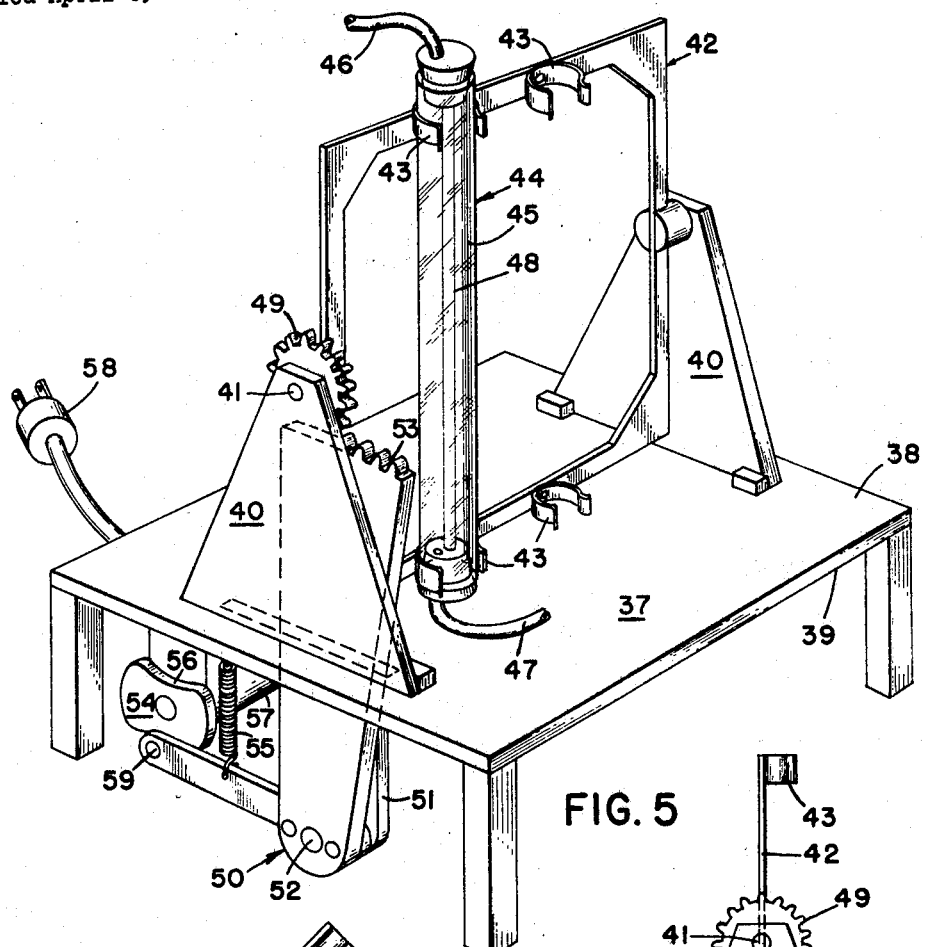

United States Patent Office 3,503,877
Patented Mar. 31, 1970

3,503,877
DIALYZER AGITATOR
William J. Berry, 1021 Green St.,
Durham, N.C. 27701
Filed Apr. 9, 1965, Ser. No. 447,034
Int. Cl. B01d 35/20
U.S. Cl. 210—19                14 Claims

ABSTRACT OF THE DISCLOSURE

A process and apparatus for performing accelerated or mechanical dialysis wherein a solution-containing membranous container is suspended within a surrounding solute or dialyzing medium and the solution and solute are then oscillated to accelerate the diffusion of dissolved substances from the solution through the membrane of the container into the surrounding solute.

BACKGROUND AND OBJECTIVES OF THE INVENTION

Dialysis is one of the most universally used procedures in the laboratory and in industry. It is the process of separating compounds or materials by the difference in their rates of diffusion through a semipermeable membrane. Conventionally, the term dialysis denotes the separation of colloids from noncolloids, but in the wider sense in which the term is employed here, it includes the separtion of several low-molecular (noncolloidal) solutes from each other. The process may be expected to compare favorably with others where one or more of the following conditions are encountered: (1) where the concentration of reactive components are so high or the unit value of the recovered material is so low that chemical separation is uneconomical; (2) where the components cannot be chemically separated because they are nonreactive to common chemicals or because they react too similarly to be differentiated; (3) where simultaneous separation of a variety of components is desired; (4) where separation without contamination of either fraction by foreign substances is required; (5) where one or several of the components are sensitive to heat or chemicals, such as proteins; or (6) where the components exhibit a marked difference in molecular weight. Dialyzing procedures are indispensable in the food, chemical, biological, pharmaceutical and nuclear power fields.

Prohibitive cost of suitable and essential equipment result in dialysis being carried out, in many instances, by the stationary method. This method consists simply of filling a membranous bag with an undialyzed liquid, i.e., a liquid to be dialyzed, sealing the bag and then suspending it in a container filled with solute. Although this procedure is effective in bringing about complete dialysis over an extended period of time, there is a serious drawback in using this stationary method. The diffusion of a low-molecular solute through the membrane is very slow, and the slowness necessitates periodic emptying and refilling of the entire container, thus consuming additional time.

Early attempts at mechanical dialysis utilizing the multiple dialyzers have fallen short of fulfilling their purpose of avoiding the heretofore time consuming stationary process. The major disadvantage of such units is that they fail to agitate both solute and solution. The present invention has overcome the attendant disadvantages of these conventional multiple dialyzers since both solution and solute are continuously agitated to affect rapid and efficient diffusion, and, additionally, the agitation is accomplished in a splash-free manner.

A conventional dialyzer usually consists of two chambers separated by a membrane. Dialyzing membranes, frequently referred to as semipermeable membranes, are structures such as parchment or cellophane, which, when interposed between two bodies of liquid, prohibit their gross intermixture but permit the passage of diffusible solutes or at least one of several compounds in solution from one body of liquid to the other. At the beginning of the process, the liquid to be dialyzed is partitioned off from the receiving solvent by the membrane. In time, a portion of the low-molecular solute transfers from one compartment to the other by diffusion, and, in most instances, some liquid from the solvent transfers to the compartment holding the dialyzed liquid or dialyzate by osmosis.

The present invention incorporates the basic or conventionally used dialyzer in combination with an oscillating structure for continuous and rapid diffusion and is particularly useful when applied in the production of biologicals and pharmaceuticals.

Therefore, it is an object of the present invention to provide a device for effecting accelerated selective separation of solutes by means of their unequal diffusion through membranous substances.

Another object of the invention is to achieve selective accelerated diffusion of solutes by continuously agitating both solution and solute in a splash-free manner with optimum efficiency.

A further object of this invention is to provide an apparatus for selective accelerated diffusion of solutes that may be modified to accommodate a variety of undialyzed liquids and receiving solvent volumes.

Yet another object is to describe a process for separating solutes by means of accelerating their unequal diffusion through membranes or diaphragms.

Yet another object is to disclose a process for separating solutes by accelerated diffusion that may be controlled in speed and quantity with optimum dialyzing efficiency.

Some of the objects of the invention have been stated but many other objects and attendant advantages will appear from the following detailed description taken in conjunction with the accompanying drawings, in which like characters of reference designate corresponding parts throughout the several views.

FIGURE DESCRIPTION

FIG. 5 is a perspective view of an alternative embodiment of the mechanical dialyzer illustrating the planar oscillator pivotally positioned between supporting legs and carrying a dialyzing chamber.

FIG. 6 is a reduced side elvational view of the mechanical dialyzer illustrating the planar oscillator in a displaced position by means of the driving motor and cam.

FIG. 7 is a slightly reduced side elevational view of the mechanical dialyzer illustrating the planar oscillator

DETAILED DESCRIPTION

Figure 1:
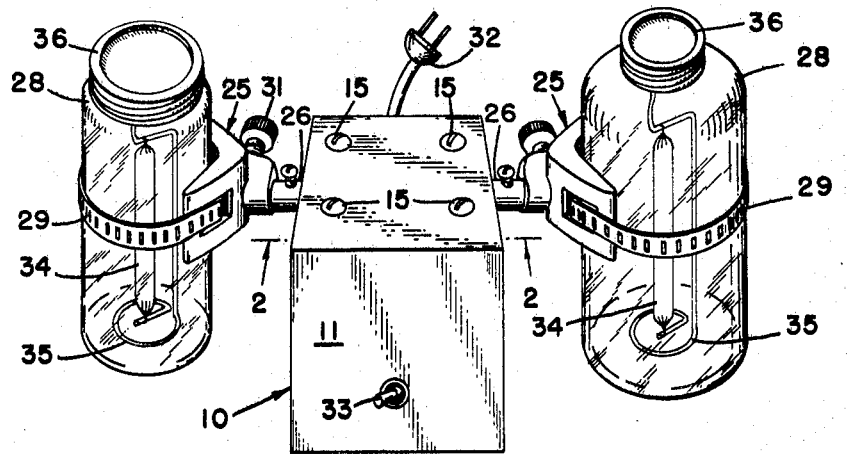
FIG. 1 is a perspective view of the preferred embodiment of the mechanical dialyzer illustrating the base housing and supported dialyzing chambers.
Figure 2:
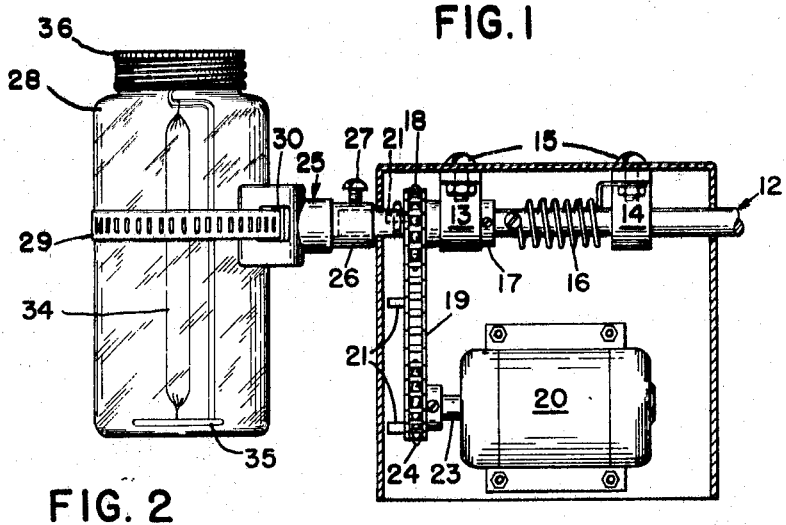
FIG. 2 is an enlarged sectional side elevational view of the dialyzer base, oscillator rod and chamber illustrating the oscillating mechanism and means within the base and their cooperation with the biased rod and supported chamber.

Referring now to the drawings and particularly to FIG. 1, the preferred embodiment of this mechanical dialyzer is comprised of a base 10 constructed in the form of a housing 11 which is open underneath to allow ready access for maintenance and replacement of parts, and an oscillator rod 12 extending from each side of base 10 and supported thereto internally by lugs 13 and 14, these lugs being secured in a conventional manner by means of screws 15 to the base housing's upper surface.

Figure 3:
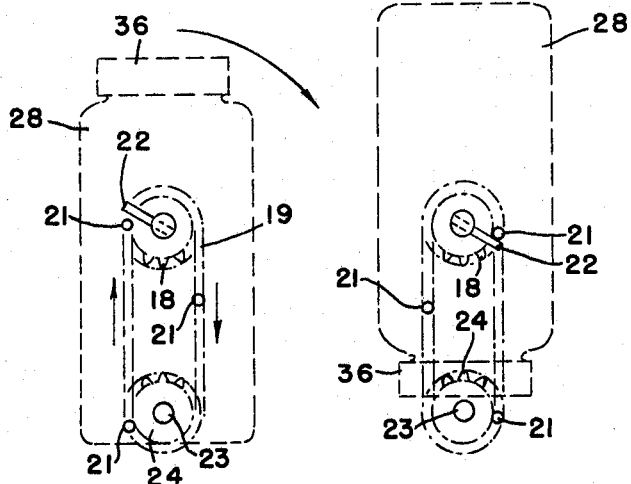
FIG. 3 is a side elevational view of a dialyzing chamber in its first upright position illustrating the pawl and chain configuration for commencing the oscillation of that chamber.
Figure 4:
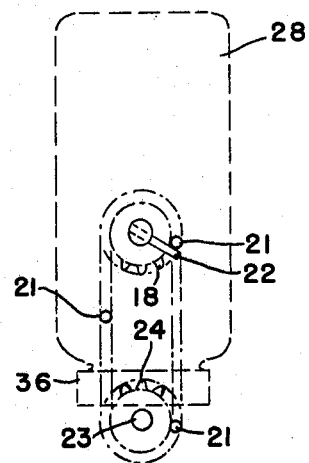
FIG. 4 is a side elevational view of a dialyzing chamber in its second inverted position after the chamber has been displaced by the illustrated pawl and chain operation.

Oscillator rod 12 is rotatably or movably supported within lugs 13 and 14 and is continuously urged or biased to an original or first position by means of a helical spring 16. This spring surrounds and is affixed to rod 112 at one end while being secured at the other end by a screw 15 partially supporting lug 14. As rod 12 is urged or rotated to any position, spring 16 is flexed and exerts a force to return rod 12 to its original or first position. Bushing 17 surrounds rod 12 and maintains on one end a notched pulley 18 that cooperatively engages driving chain 19 as that chain is displaced by the rotation of shaft 23 of motor 20. Bushing 17 is slidably maintained on rod 12 in order that it may move without displacing that rod so long as the rod oscillating pawls 21 do not engage finger 22 which is rigidly secured to and an integral part of rod 12. As motor 20 is operated, its shaft 23 turns a notched gear or pulley 24 which cooperatively engages chain 19 for continuous rotation. A chain 19 is moved by the operation of motor 20, pawls 21 extending outwardly from the chain's normal vertical operating path move along the path of chain rotation and engage finger 22 when a pawl 21 makes contact therewith as shown in FIG. 3. Finger 22, being rigidly secured to and integral with rod 12 is maintained normally in the position shown in FIG. 3 by the resilient and biasing action of helical spring 16. As pawl 21 moves along the chain's path of rotation, it urges finger 22 through an angular displacement of approximately 180 degrees before it moves beyond the contacting position shown in FIG. 4. Once pawl 21 is disengaged from finger 22, the biasing action of spring 16 will return finger 22 to its original position as illustrated in FIG. 3. In this preferred embodiment, there are positioned three pawls 21 spaced equidistant from each other along the chain's periphery to provide a moderate and consistent oscillating effect since finger 22 has ample time to return to its original position and rest or remain stationary momentarily before being engaged and rotated by the second following pawl. Thus the effect of the chain driven pawl mechanism is to continuously rotate rod 12 from an original or first position to a second position approximately 180 degrees away.

Each end of rod 12 that extends from housing 11 carries a dialyzer supporting frame or yoke 25 which is rigidly secured to rod 12 by bushing or hub 26 and its cooperating setscrew 27. Consequently, as the oscillating mechanism displaces or rotates rod 12, this carried supporting frame responds to the rod's precise movement. The supporting frames 25 are generally circular or arcuate in shape to cooperatively receive a cylindrically shaped dialyzing chamber 28. A convenient means for securing chamber 28, regardless of its circumference, is to encircle the chamber with an adjustable band 29 which is received in apertures 30 of frame 25 and which is threadably adjustable by means of a thumbscrew 31 which may be easily operated to secure very quickly a chamber of any desired size and shape. The present embodiment contemplates the use of two such supporting frames, but only minor adjustments would be necessary to increase this number.

The oscillating mechanism is, of course, driven by motor 20 which is of convenient and conventional size and voltage and which can be operated by inserting plug 32 into a conventional 120 volt wall outlet (not shown). An on-off toggle switch 33 is positioned conveniently on the surface of the base housing for rapid and efficient actuation.

Dialyzing chamber 28 includes a membranous container or tube 34 for retaining a solution of undialyzed liquid, and, as has been mentioned earlier, this dialyzing membrane, which is frequently referred to as a "semipermeable membrane," is a structure such as parchment or cellophane, which, if interposed between two bodies of liquid, prevents their gross intermixture but permits the passage of at least one of several dissolved substances from one body of liquid to the other.

Container 34 is maintained in a vertical maximum exposed position by means of a support member 35 secured within chamber 28 by any convenient fastening or tensioning means. Container 34 is most effectively situated when its longitudinal axis coincides with the longitudinal axis of the dialyzing chamber, since this will afford maximum exposure of chamber 34 to the liquid or solute that will surround it within chamber 28. This surrounding fluid or solute represents the receiving medium for accepting the diffusible substances as they pass from within container 34 through the membranous walls of that container into the receiving liquid.

The terminology of dialysis varies widely. For the purposes of this description, the liquid to be dialyzed is called the undialyzed liquid or solution and after it has been subjected to the dialysis treatment or process, that is, after some or all of the permeable substances have been removed, it is called the dialyzed liquid. The liquid to receive the diffusible substances is called the solute or receiving solvent. After some of all of the diffusible substance has passed into the solute or receiving solvent, it is commonly referred to as diffusate.

As is readily apparent from the drawings, economical dialyzer chambers can be constructed from conventional glass containers, and the large opening usually associated with this structure provides convenient access to the supported membranous container 34 during and after the dialyzing operation. These particular chambers are, of course, sealably capped with a conventional lid 36.

FIGS. 5 through 7 illustrate an alternate embodiment of the present invention that is more adapted to laboratory use than the preferred embodiment because quantities of dialyzed liquids are not necessarily required.

In FIG. 5, a base or floor member 37 having exposed surfaces 38 and 39 provides a platform or foundation oscillating assembly and oscillator support members or legs 40. These upstanding support members or legs 40 are secured to base 37 along its upper exposed surface 38 opposite each other in spaced-apart relationship. Legs 40 pivotally retain along a horizontal axis 41 a planar oscilltor or rack member 42 which is provided with pairs of spaced-apart clamping devices 43 for securing a plurality of diffusing chambers generally designated 44 similar to that shown in FIG. 5. Chamber 44, being tubular in construction, has an interior cylindrical passageway 45 to allow circulation of solutes or receiving solvent therethrough as this solute or receiving solvent is introduced through inlet line 46 and eventually expelled through outlet line 47. A solution retaining membrane 48 holds solution containing dissolved substances within passageway 45 so that these dissolved substances may diffuse through the membranous wall into the solute or receiving solvent circulating therearound. The membranous containers are usually cut in lengths, filled with speciments, knotted at each end and then suspended within the confines of passageway 45 where diffusion takes place. A gear engaging pulley 49 is integrally attached to planar oscillator 42 so that any rotation of pulley 49 will cause a similar rotation or displacement by oscillator 42.

A ball crank 50 is affixed to lower surface 39 of base 37 by a supporting bracket 51, and crank 50 is pivotally secured to support 51 by a pin 52 that will allow free rotation about this fixed point. Crank 50 extends through and above surface 38 of base 37 to engage pulley 49 along its notched periphery 53. The opposite free end 59 of crank 50 rides a cam 54 and is continuously biased against that cam's periphery by restraining spring 55. As cam 54 rotates, its selected contour 56 will ride against crank end 59, displace crank 50 and cause oscillator 42 to be first inclined (FIG. 6) and then returned to a vertical position (FIG. 7).

Cam 54 is revolved by the shaft of an electric motor 57 appropriately reduced by conventional means to a convenient rate of shaft rotation applied with voltage and current through a conventional plug 58 inserted into an ordinary and conventional 120 volt wall outlet (not shown). Obviously, motors of different ratings might be substituted should loading or space requirements so dictate.

Thus it can be seen that this alternative embodiment of the mechanical dialyzer employs an oscillatory movement whereby the cam contour 56 displaces the ball crank 50 which in turn inclines the planar oscillator 42 to a desired position. This positioning or tilt regulation of the oscillator 42 makes it possible to vary the rate of diffusion depending upon the angular displacement and rate of oscillation. The angular displacement from the vertical or original position of the planar oscillator 42 in this alternative embodiment is approximately 45 degrees as is illustrated in FIGS. 6 and 7. The variations in diffusion rates require only a change of the contour 56 of cam 54 or in the gear ratios of motor 57 to vary the motor's shaft rotation speed.

It is contemplated that the embodiment shown in FIGS. 5 through 7 may be utilized in conjunction with a tank in which the solute is retained whether with continuous fluid circulation or a static fluid reservoir and the membranous container or dialysis bag 48 releasably clamped at its ends to suitable clamping members on the oscillator 42 with the entire apparatus being inverted and immersed into the tank up to the level of the base 37 submerging the dialysis bag.

Obviously, many modifications and variations may be made in the construction and arrangement of the oscillating mechanisms and dialyzing chambers as well as the other phases of the present inventive concept shown in these two embodiments in the light of the above teachings without departing from the real spirit and purpose of this invention. Such modification of parts and alternatives as well as the use of mechanical equivalents to those herein illustrated and described are reasonably included and modifications are contemplated.

What is claimed is:

1. An apparatus for selectively diffusing dissolved substances from solution to a dialyzing medium comprising: a dialyzer supporting frame carrying at least one dialyzer chamber thereon, said frame and carried chamber being mounted about a horizontal axis for circulatory movement about said axis, said chamber having a membranous solution-filled container supported therein substantially completely surrounded by said dialyzing medium for maximum surface contact therewith; and means rotating said frame and supported chamber to accelerate the diffusion of dissolved substances from the solution through the container into the dialyzing medium.

2. An apparatus for selectively diffusion dissolved substances from solution to surrounding solute at an accelerated rate comprising: a base having an upper and lower exposed surface; upstanding laterally spaced-apart oscillator supports secured to said base upper surface; a planar oscillator pivotally mounted between said upstanding supports; a diffusing chamber carried for movement between limits by said oscillator, said chamber having a passageway for receiving circulating solute and a solution retaining semipermeable membrane suspended within said passageway; and means for selectively and pivotally displacing said oscillator and carried chamber between limits.

3. An apparatus for selectively diffusing dissolved substances from solution to surrounding solute comprising: a base having dialyzer-supporting means, said means including a frame member releasably clamping and supporting a dialyzer chamber and a securing member supporting said frame for pivotal movement between limits about a horizontal axis, said chamber having a solution retaining semipermeable membrane positioned therein and circulating solute surrounding said membrane within said chamber; and means for oscillating said frame and supported chamber between limits whereby diffusion of an unwanted dissolved substance within the solution retaining membrane passes through the membrane and into the surrounding solute.

4. An apparatus for selectively diffusing dissolved substances from solution to surrounding solute comprising: a base; an oscillator rod horizontally positioned through said base for rotation from a first to a second position and back again; means for yieldably biasing said rod to said first position; means for rotating said rod against said biasing means and releasing said rod when it reaches said second position; and a dialyzer supporting frame having a dialyzer chamber supported thereon for rotation with said rod, said chamber having a membrane constructed solution container therein for maximum membrane surface exposure to solute contained within said chamber whereby the dialyzer chamber is continuously oscillated to accelerate the diffusion of a dissolved substance from the solution container through the membrane into the solute.

5. An apparatus for diffusing dissolved substances from solution to surrounding solute comprising: dialyzer supporting means, said means including thereon means rotatable about a substantially horizontal axis for releasably supporting a dialyzer chamber for pivotal movement between limits about said substantially horizontal axis, said chamber having a solution containing membrane positioned therein for maximum exposure to solute contained within said chamber; and means for oscillating said dialyzer chamber supporting means and supported chamber from a first position to a second position and back again to accelerate diffusion of an unwanted substance within the membrane retained solution through the membrane into the solute.

6. An apparatus for selectively diffusing dissolved substances from solution into surrounding solute comprising: a base; an oscillator rod horizontally positioned through said base for selected rotation; means for selectively oscillating said rod and returning said rod to its original position; a dialyzer chamber supported for selective movement with said rod, chamber comprising a solution containing membrane positioned for exposure to solute held within said chamber whereby the dialyzer chamber is selectively oscillated between limits to accelerate the diffusion of dissolved substances from the solution through the membrane into the surrounding solute.

7. An apparatus for selectively diffusing dissolved substances from solution to surrounding solute comprising: a base; a dialyzer supporting frame having at least one dialyzer chamber thereon, said frame and chamber being pivotally mounted about a horizontal axis for oscillation between limits, said dialyzer chamber having a membranous solution-filled container supported therein and solute surrounding said container; and means including a yieldably biased rod for oscillating said frame and supported chamber whereby the oscillation of the chamber accelerates the diffusion of dissolved substances from the solution through the membranous container into the solute.

8. The method for selectively diffusing dissolved substances through a semipermeable memberane suspended within a diffusing chamber comprising the steps of: confining a solution containing dissolved substances within the suspended semipermeable membrane; continuously directing fluid into the diffusing chamber to surround the exterior of the solution containing membrane; and oscillating the diffusing chamber containing the confined solution and surrounding fluid between limits until the undesired substances have diffused from the solution through the semipermeable membrane to the circulating solute.

9. A method for selectively diffusing dissolved substances through a semipermeable membrane held in a diffusion chamber at an accelerated rate comprising the steps of: confining a solution containing dissolved substances to be removed within the semipermeable membrane; suspending the solution containing membrane in the diffusion chamber; continuously circulating a solute around the exterior of the solution containing membrane and continuously oscillating the confined solution and circulating solute between limits until the dissolved substances to be removed have passed from the solution through the semipermeable membrane into the circulating solute.

10. An apparatus for selectively diffusing dissolved substances comprising: a base; a pair of opposed laterally spaced-apart frame supporting legs; a dialyzer supporting frame having means for supporting at least one dialyzer chamber thereon and pivotally mounted about a horizontal axis to said supporting legs; a dialyzer chamber having inlet and outlet lines for continuously circulating fluid through said chamber, said chamber having a permeable membrane supported therein around which said fluid may circulate as it passes from said inlet to said outlet line through said chamber; and means for oscillating said frame while fluid circulates through said chamber.

11. An apparatus for selectively diffusing dissolved substances from solution to surrounding solute comprising: a base; a dialyzer supporting frame maintaining at least one dialyzer chamber thereon and pivotally mounted about a horizontal axis for oscillation between limits, said chamber having a solution containing membrane therein and solute circulating about said membrane; and means including a spring biased member for oscillating said frame and supported chamber between limits whereby the oscillation of the chamber accelerates the diffusion of dissolved substances from the solution through the containing membrane into the solute.

12. An apparatus for selectively diffusing dissolved substances from solution to surrounding solute comprising: a base forming a housing, said housing rotatably supporting a horizontally positioned rod; a dialyzer supporting frame extending from said base at least one dialyzer chamber adjacent said frame; means for releasably supporting said chamber on said frame, said frame being secured to said rod for rotation, said chamber having a membranous container supported therein and solute circulating about said container for maximum surface contact therewith; and means imparting circulatory motion to said rod to accelerate the diffusion of dissolved substances from the solution container through the membrane into the solute.

13. An apparatus for selectively diffusing dissolved substances from solution to a surrounding liquid comprising: a base, said base supporting for rotation a horizontally positioned oscillator rod yieldably biased to a first position; a dialyzer supporting frame having means for supporting at least one dialyzer chamber thereon, said frame being secured to said oscillator rod for rotation from said first position to a second position and said chamber having a membranous solution retaining container supported therein, said chamber having liquid surrounding said container for low-molecular substance transfer from said solution to said liquid; and means for selectively oscillating said rod whereby the dialyzer chamber is oscillated with the rod to accelerate the diffusion of dissolved substances from the solution container through the membrane into the surrounding liquid.

14. The method of selectively diffusing dissolved substances from solution through a membranous container suspended within a diffusing chamber into surrounding solute comprising the steps of: enclosing an undialyzed liquid in a membranous container to prevent gross intermixture within a diffusing chamber of solution and solute; continuously circulating fluid through the chamber; and agitating the diffusing chamber and membranous container held therein until a low-molecular substance diffuses from the solution through the membranous container to the solute.

References Cited

UNITED STATES PATENTS

| | | | |
|---|---|---|---|
| 2,985,587 | 5/1961 | Hoch et al. | 210—22 |
| 3,055,504 | 9/1962 | Schultz | 310—321 X |
| 3,212,499 | 10/1965 | Koreski | 210—321 X |
| 3,199,680 | 8/1965 | Schiff | 210—321 |
| 3,265,366 | 8/1966 | Warner | 259—56 |

REUBEN FRIEDMAN, Primary Examiner

F. A. SPEAR, JR., Assistant Examiner

U.S. Cl. X.R.

210—22, 321